(12) United States Patent
Mellot

(10) Patent No.: US 10,989,814 B2
(45) Date of Patent: Apr. 27, 2021

(54) METHOD FOR MANAGING DYNAMIC RANGE OF AN OPTICAL DETECTION DEVICE, AND CORRESPONDING DEVICE

(71) Applicant: STMicroelectronics (Grenoble 2) SAS, Grenoble (FR)

(72) Inventor: Pascal Mellot, Lans en Vercors (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 318 days.

(21) Appl. No.: 16/236,874

(22) Filed: Dec. 31, 2018

(65) Prior Publication Data

US 2019/0204148 A1    Jul. 4, 2019

(30) Foreign Application Priority Data

Jan. 2, 2018 (FR) ...................................... 1850012

(51) Int. Cl.
| | |
|---|---|
| *G01J 1/44* | (2006.01) |
| *G01S 17/894* | (2020.01) |
| *G01S 7/4914* | (2020.01) |
| *G01S 17/42* | (2006.01) |
| *G01S 7/4863* | (2020.01) |
| *G01S 17/931* | (2020.01) |
| *G01S 7/4861* | (2020.01) |

(52) U.S. Cl.
CPC ............... *G01S 17/894* (2020.01); *G01J 1/44* (2013.01); *G01S 7/4863* (2013.01); *G01S 7/4914* (2013.01); *G01S 17/42* (2013.01); *G01S 17/931* (2020.01); *G01J 2001/4406* (2013.01); *G01J 2001/4466* (2013.01); *G01S 7/4861* (2013.01)

(58) Field of Classification Search
CPC ...... G01S 7/4861; G01S 7/4913; G01S 17/42; G01S 17/894; G01J 1/44; G01J 2001/4406
USPC ....................................................... 250/214 R
See application file for complete search history.

(56) References Cited

U.S. PATENT DOCUMENTS

| | | |
|---|---|---|
| 2011/0248880 A1 | 10/2011 | Miyahara et al. |
| 2012/0242799 A1 | 9/2012 | Saito |
| 2015/0041625 A1* | 2/2015 | Dutton ..................... G01S 17/10 250/208.1 |
| 2019/0056497 A1* | 2/2019 | Pacala ..................... G01S 7/4865 |

FOREIGN PATENT DOCUMENTS

| | | |
|---|---|---|
| DE | 102012102320 A1 | 9/2012 |
| WO | 2010149593 A1 | 12/2010 |

* cited by examiner

*Primary Examiner* — Kevin K Pyo
(74) *Attorney, Agent, or Firm* — Slater Matsil, LLP

(57) ABSTRACT

A method for managing a dynamic range of an optical detection device illuminated by a modulated optical radiation, the method including: generating a detection signal from the modulated optical radiation; generating, based on the detection signal, a histogram including a plurality of histogram classes; comparing a chosen maximum value and a value of each histogram class of the plurality of histogram classes; and stopping a generation of the histogram in response to a determination that the value of any one of the plurality of histogram classes is equal to the maximum value.

20 Claims, 3 Drawing Sheets

METHOD FOR MANAGING DYNAMIC RANGE OF AN OPTICAL DETECTION DEVICE, AND CORRESPONDING DEVICE

CROSS-REFERENCE TO RELATED APPLICATIONS

This application claims the benefit of French Application No. 1850012, filed on Jan. 2, 2018, which application is hereby incorporated herein by reference.

TECHNICAL FIELD

This disclosure relates generally to optical detection, and in particular embodiments, to a method of managing a dynamic range (e.g. the ratio between the highest and lowest measurable luminous intensities) of an optical detection device, and a corresponding device.

BACKGROUND

During the last few years, a growing number of applications such as facial recognition, virtual reality and active motor vehicle safety are more often demanding high-performance imaging systems that are of small size and low cost.

In this respect, imaging systems based on the time of flight measurement principle, commonly referred to as the abbreviation "ToF" by the person skilled in the art and benefiting from a highly integrated structure and a precise and rapid performance, respond particularly well to these expectations.

Such a "ToF" imaging system generally transmits optical light radiation, for example of the infrared or laser type, towards an object located in its field of measurement so as to measure the time of flight of this radiation, in other words the time that elapses between its transmission and its reception by the imaging system after reflection at the object. Such a direct measurement is known to the person skilled in the art by the abbreviation "dToF" (direct Time of Flight).

However, such optical light radiation can simply be too weak to generate an analogue voltage representing the optical light flux. Specifically, the optical light radiation can include only a few photons per excitation/transmission cycle.

Consequently, the time resolution demanded by certain applications is often difficult to achieve with conventional electronic transient recorders.

A possible solution to address this kind of problem is based on the use of indirect time of flight measurement techniques, commonly referred to as the abbreviation "iToF" by the person skilled in the art.

More specifically, with a periodic modulated excitation from for example a laser, it is possible to indirectly measure the distance separating an object to be measured and the imaging system referred to as "iToF" via a measurement of the phase shift of the signal received after the reflection at the object with respect to the transmitted radiation and to extend a collection of data of the optical signal over several excitation and transmission cycles so as to improve the precision of the measurement.

This solution is based on a precise repetitive time recording of each photon of an optical light radiation, for example laser radiation, taking the optical period of the radiation as time reference.

To achieve this, several types of single-photon detectors can be used such as single-photon avalanche diode detectors, commonly referred to as the abbreviation "SPAD" by the person skilled in the art.

In this respect, a histogram feature is particularly interesting for SPAD detectors in order that precise timing information can be worked out upon the arrival of each single photon from the optical light radiation.

However, such a single-photon detector receives in reality not only the reflection of the transmitted optical light radiation but also other background light radiation around the detector.

Consequently, this other background light radiation can to a greater or lesser extent affect the measurement by the single-photon detector.

In an imaging system including several single-photon detectors, each dedicated to an area in a detection scene, the measurement time for each detector is generally configured to be identical.

However, a scene to be measured is also illuminated by background optical light radiation, or "background light", for example a sunray. SPAD detectors can therefore also receive photons from this background optical light radiation.

For a scene to be measured including several areas, each having a different radiation profile, the time required for each dedicated detector to achieve the same level of performance, for example the limit of its dynamic range, is therefore variable.

The radiation profile represents in this case a rate of detectable individual photons. If an area of the scene is illuminated by a sunray, the radiation profile of this area becomes too strong and the dynamic range of the detector dedicated to this area can be reached in a very short time.

In other words, a first detector dedicated to an area having a weak radiation profile requires a longer measurement time than a second detector dedicated to an area having a strong radiation profile in order to achieve the same performance level.

A measurement time suitable for the first detector can therefore lead to a disqualification of the measurement by the second detector due to peak-clipping or data overflow in the second detector.

In this respect, there is therefore a need to propose a technical solution that is of low complexity and small size, providing for individually managing the dynamic range of each optical detection device so as to avoid such a disqualification of the measurement by the device and possibly limiting the average energy consumption of an optical detection device receiving transmitted or background optical light radiation having a high rate of detectable individual photons.

SUMMARY

According to one aspect, there is proposed a method for managing the dynamic range of an optical detection device illuminated by at least one modulated optical radiation. This method includes the generation of a detection signal from the at least one modulated optical radiation; the production, based on the detection signal, of a histogram including histogram classes; a comparison between a chosen maximum value and the value of each histogram class; and the stopping of the production if the value of any one of the histogram classes reaches the maximum value.

Advantageously, such a method provides for avoiding a saturation of the measurement by the optical detection device when the measurement time of the device is too long with respect to the profile of the radiation received by the device.

According to one implementation, the method additionally includes the stopping of the generation of the detection signal if the value of any one of the histogram classes reaches the maximum value.

Such a method advantageously provides for a limiting of the energy consumption of the optical detection device by stopping the generation of the detection signal, in other words the reception and processing of the optical light radiation received by the device, when the profile of the radiation received by the device is too strong.

By way of non-limiting example, the maximum value can be adjustable.

Therefore, the dynamic range of the optical detection device can be adjustable and adapted to a specific configuration by modifying the maximum value, which is very useful to further optimize the performance of the device.

The histogram classes can for example be defined as a function of the frequency of the modulated optical radiation.

By way of non-limiting indication, the integration duration of each histogram class can for example be equal to the period of the modulated optical radiation divided by the number of histogram classes.

According to another implementation, the generation of the detection signal is achieved via a detection of individual photons received by at least one single-photon detector of the single-photon avalanche diode (SPAD) type.

According to another aspect, there is proposed an optical detection device. The device includes an optical detection circuit intended to be illuminated by at least one modulated optical radiation and configured to generate a detection signal from the at least one modulated optical radiation, a processing circuit configured to produce, based on the detection signal, a histogram including histogram classes, a comparison circuit configured to compare a chosen maximum value and the value of each histogram class, and a control circuit configured to deactivate the processing circuit so as to stop the production of the histogram if the value of any one of the histogram classes reaches the maximum value.

As such, the control circuit is advantageously configured to avoid peak-clipping or measurement overflow in the processing circuit when the measurement time is not suitable.

According to one embodiment, the control circuit is additionally configured to deactivate the optical detection circuit so as to stop the generation of the detection signal if the value of any one of the histogram classes reaches the maximum value.

Advantageously, the energy consumption of the optical detection device can be limited once the dynamic range of the device chosen via the maximum value is reached.

The maximum value can for example be adjustable. In one digital implementation, the maximum value can for example be programmable.

According to another embodiment, the histogram classes are defined as a function of the frequency of the modulated optical radiation.

According to yet another embodiment, the detection circuit includes at least one single-photon detector of the single-photon avalanche diode type.

By way of non-limiting indication, the detection circuit can for example include a matrix of SPAD detectors integrated together via a tree of adders or a tree of OR logic gates.

The device can for example be produced in an integrated manner.

According to another aspect, there is proposed an imaging system such as a camera including at least one optical detection device as defined above.

According to another aspect, there is proposed an electronic apparatus, for example a tablet or a cellular mobile phone, incorporating at least one imaging system as defined above.

According to yet another aspect, there is proposed a motor vehicle including at least one imaging system as defined above.

BRIEF DESCRIPTION OF THE DRAWINGS

Other advantages and features of the invention will become clearer upon examining the detailed description of implementations and embodiments, which are not at all limiting, and accompanying drawings in which.

DETAILED DESCRIPTION OF ILLUSTRATIVE EMBODIMENTS

Figure 1:
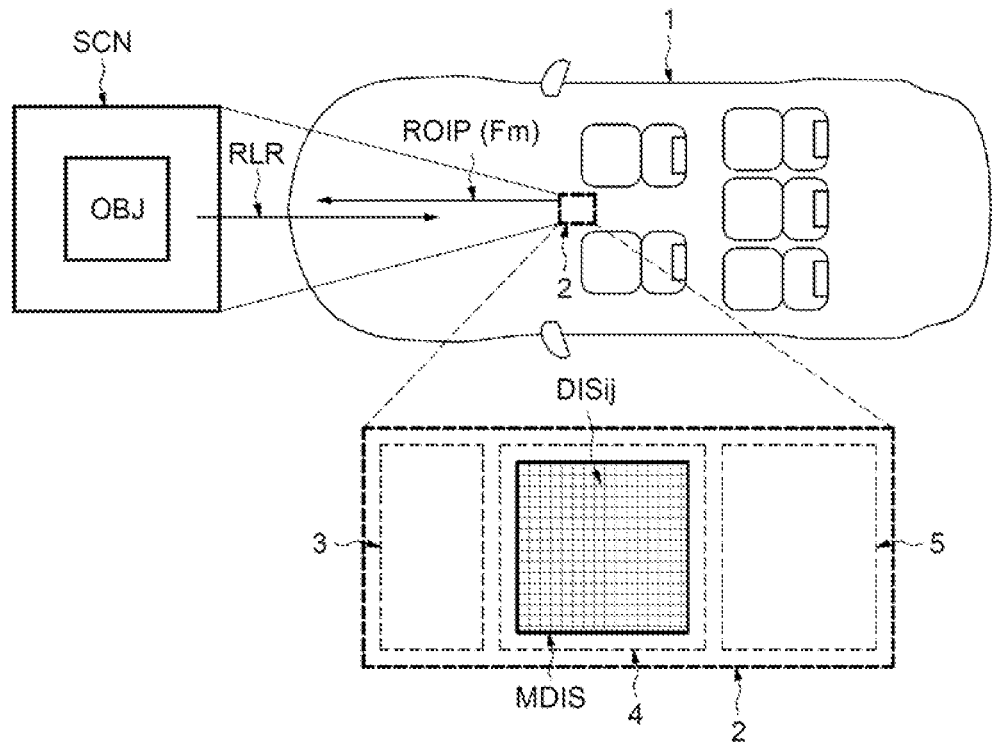
FIGS. 1 to 4 schematically illustrate implementations and embodiments of the invention.

The reference 1 in FIG. 1 illustrates a motor vehicle, for example a car 1 equipped with at least one imaging system, in this case for example a light-based remote sensing system 2 commonly referred to as the abbreviation "LiDAR" (Light Detection And Ranging) by the person skilled in the art, in order to detect one or more objects in a detection scene of the LiDAR system 2 and measure the distance or distances separating this or these objects and the system 2 in the form of a depth map of the scene.

The imaging system 2 includes transmission circuit 3, measurement circuit 4 and processing circuit 5.

When the imaging system 2 is in operation, the transmission circuit 3 transmits at least one periodic initial optical radiation ROIP towards a scene SCN. If one or more objects OBJ are present in this scene SCN, the system 2 can receive a reflected luminous radiation RLR resulting from a reflection of the initial optical radiation ROIP on the object(s).

The measurement circuit 4 includes at least one optical detection device, in this case for example a matrix MDIS of 30×30 optical detection devices DISij, i=1, 2, 3 ... 30, j=1, 2, 3 ... 30 each forming a pixel of this matrix MDIS.

Each optical detection device DISij is illuminated by the reflected luminous radiation RLR. To perform a counting of individual photons correlated in time, each device DISij is configured to generate a corresponding detection signal SDij if this device DISij receives an excitation of the reflected luminous radiation RLR resulting from the reflection.

As will be seen in more detail below, each device DISij is additionally configured to produce, based on the corresponding detection signal, a histogram including histogram classes. The value of each histogram class represents the number of photons received by the corresponding optical detection device DISij in a chosen integration time window.

The processing circuit 5 is configured to perform a post-processing on the set of histograms generated so as to calculate the distances ("ranging") separating the object(s) OBJ and the devices DISij respectively and to generate a depth map representing the object(s) present in the scene SCN.

Figure 2:
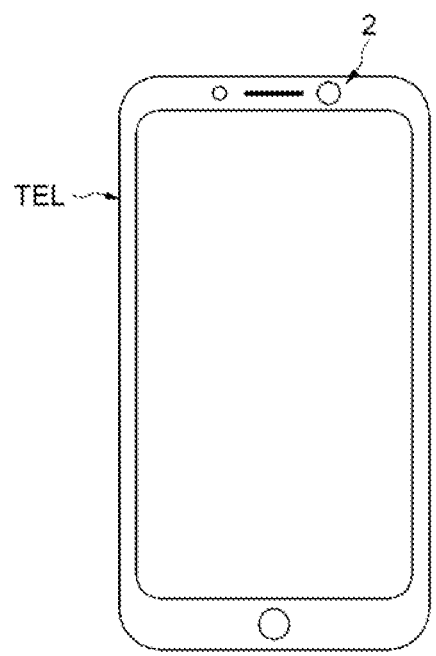

By way of example, such an imaging system 2 can also be incorporated in an electronic apparatus, for example a tablet or a cellular mobile phone, more particularly a smartphone TEL, as illustrated in FIG. 2.

The imaging system 2 incorporated in the smartphone TEL advantageously provides for three-dimensional depth measurements and three-dimensional imaging applications such as camera autofocusing and facial recognition.

Figure 3:
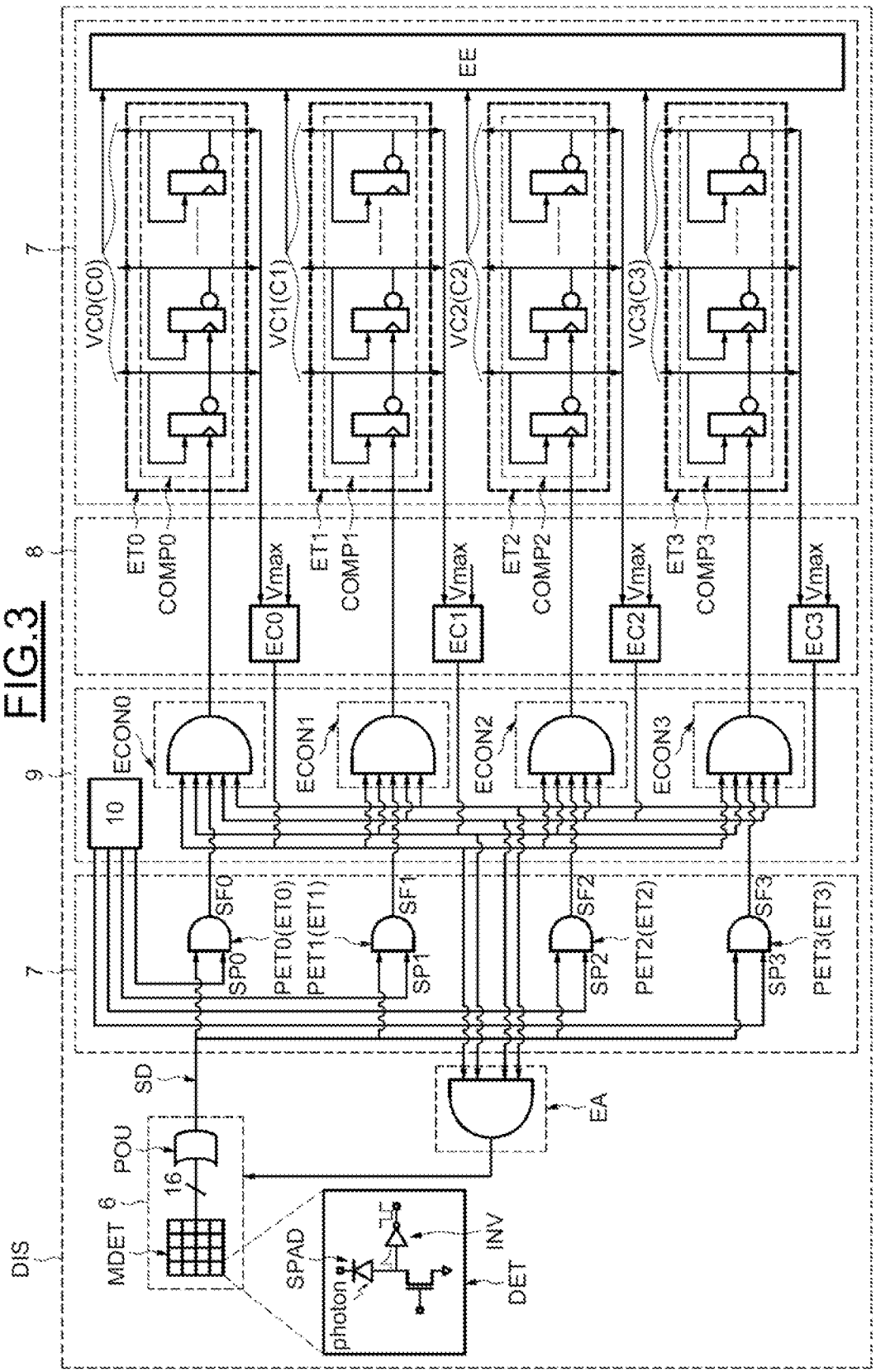

Reference is now made to FIG. 3 to illustrate an example embodiment of an optical detection device DIS of the imaging system 2.

The optical detection device DIS includes an optical detection circuit 6, a processing circuit 7, a comparison circuit 8 and a control circuit 9.

By way of indication, the processing circuit 7, the comparison circuit 8 and the control circuit 9 can be implemented fully in digital technology in order to advantageously provide greater design flexibility.

The optical detection circuit 6 includes one or more single-photon detectors, in this case for example a matrix MDET of 4×4 single-photon detectors DET of the single-photon avalanche diode (SPAD) type which are known per se to the person skilled in the art.

When a photon is received by any one of the detectors DET, a voltage pulse is generated at the cathode of the SPAD diode of this detector DET, which cathode is coupled to the input of an inverter INV. Therefore, a rectangular pulse is obtained at the output of the inverter INV.

The optical detection circuit 6 additionally includes an OR logic gate POU. The outputs of the detectors DET of the matrix MDET are commonly coupled to the input of the logic gate POU so as to generate at the output of the logic gate POU a detection signal SD (step S1 in FIG. 4) representing all the detections of photons by the matrix MDET over time.

The processing circuit 7 is intended to receive the detection signal SD and includes several processing stages, in this case for example four processing stages ET0, ET1, ET2 and ET3, and a production stage EE.

Figure 4:
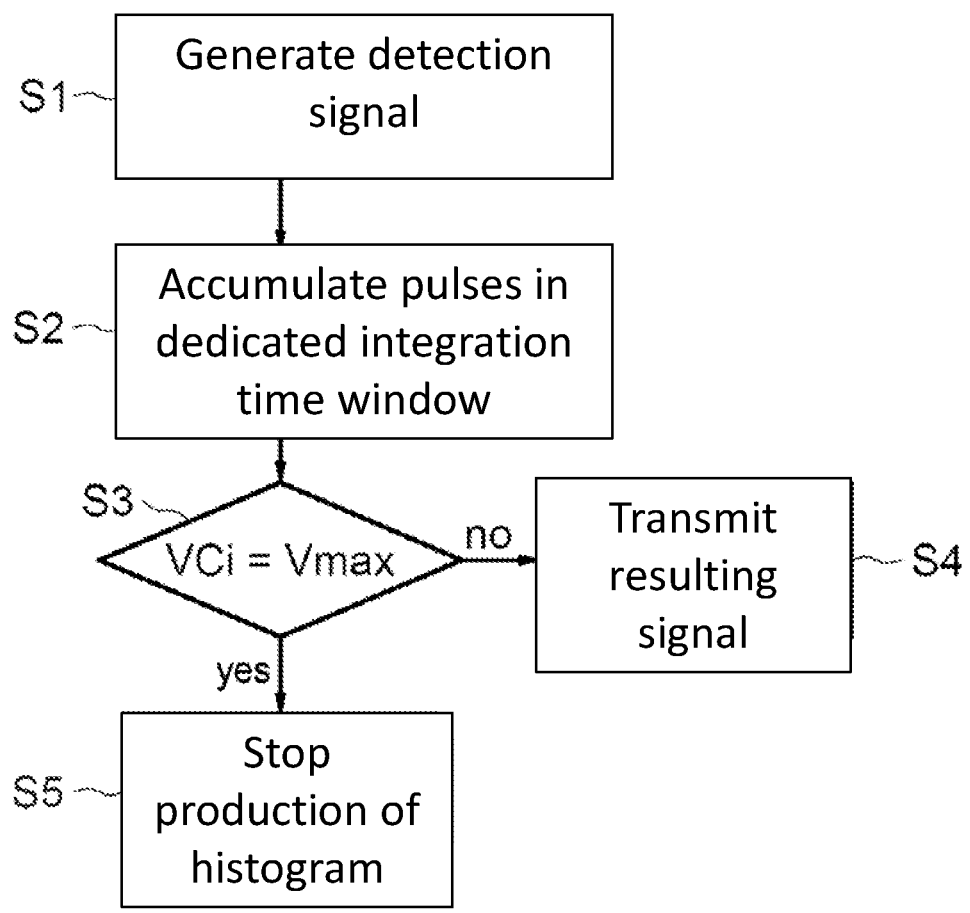

Each processing stage ET0, ET1, ET2 or ET3 is configured to periodically produce a histogram class C0, C1, C2 or C3, accumulating the number of pulses of the detection signal SD detected in a dedicated integration time window (step S2 in FIG. 4).

The integration time windows of all the processing stages ET0, ET1, ET2 or ET3 are mutually offset so as to cover a full period of the periodic initial optical radiation ROIP transmitted by the transmission circuit 3.

Consequently, the duration T of each integration time window is a function of the modulation frequency Fm of the radiation ROIP and can be calculated as follows:

$$T = (1/n)*(1/Fm)$$

The number n of processing stages, in this case four, determines the time granularity of each histogram class C0, C1, C2 or C3.

The control circuit 9 includes a phase generation stage configured to deliver four phase signals SP0, SP1, SP2 and SP3 corresponding to four integration time windows.

Each processing stage ET0, ET1, ET2 or ET3 includes an AND logic gate PET0, PET1, PET2 or PET3 receiving the detection signal SD and a corresponding phase signal SP0, SP1, SP2 or SP3 and configured to generate a corresponding resulting ("window") signal SF0, SF1, SF2 or SF3, and an asynchronous binary counter COMP0, COMP1, COMP2 or COMP3 including for example a series of D-type flip-flops coupled in series and configured to accumulate the number of pulses of the corresponding resulting signal SF0, SF1, SF2 or SF3.

The output $\overline{Q1}$ of each D-type flip-flop in each counter COMP0, COMP1, COMP2 or COMP3 is connected to the clock input of the next flip-flop.

The set of bits at the output Q1 of each D-type flip-flop of a counter COMP0, COMP1, COMP2 or COMP3 forms a digital word representing the value of the corresponding histogram class VC0, VC1, VC2 and VC3.

The production stage EE is intended to receive the values of four histogram classes VC0, VC1, VC2 and VC3 and is configured to generate a histogram including four histogram classes C0, C1, C2 and C3.

The phase difference $\Delta\varphi$ between the periodic initial optical radiation ROIP and the reflected luminous radiation RLR is calculated as follows:

$$\Delta\varphi = \frac{\arctan(VC3 - VC1)}{VC0 - VC2}$$

The distance D separating the optical detection device DIS and the object which reflects the radiation ROIP is obtained by applying the following equation:

$$D = \Delta\varphi \frac{c}{4\pi Fm}$$

where c is the speed of light in a vacuum.

The comparison circuit 8 includes as many comparison stages EC0, EC1, EC2 and EC3 as there are processing stages ET0, ET1, ET2 or ET3.

Each comparison stage EC0, EC1, EC2 or EC3 is intended to receive the value of the histogram class of the corresponding processing stage VCi, i=0, 1, 2 or 3 and a chosen maximum value Vmax, which can be for example a digital word having as many bits as the digital words VCi.

Each comparison stage EC0, EC1, EC2 or EC3 can include for example a combinational logic comparator which is known per se to the person skilled in the art and configured to deliver (step S3 in FIG. 4): a binary signal in the low state if for example the set of bits of the corresponding digital word VCi reaches the maximum value Vmax, and otherwise a binary signal in the high state.

In the case in which the implementation surface area on silicon for the optical detection device DIS is limited, it is possible for example to use only a part of the bits of the digital word VCi corresponding to the most significant bits (MSBs) in order to compare with the corresponding bits of the word Vmax.

Advantageously, it is not necessary to store the binary signals of each comparison stage EC0, EC1, EC2 and EC3 since as soon as the resulting signals SF0, SF1, SF2 and SF3 are stopped, the asynchronous binary counters COMP0, COMP1, COMP2 and COMP3 keep the values VC0, VC1, VC2 and VC3. Therefore, the binary signals are maintained.

The control circuit 9 includes as many control stages ECON0, ECON1, ECON2 and ECON3 as there are processing stages ET0, ET1, ET2 or ET3.

Each control stage ECON0, ECON1, ECON2 or ECON3 includes an AND logic gate and is coupled between the AND logic gate PET0, PET1, PET2 or PET3 and the asynchronous binary counter COMP0, COMP1, COMP2 or COMP3 of the corresponding processing stage ET0, ET1, ET2 or ET3.

Each control stage ECON0, ECON1, ECON2 or ECON3 is configured to transmit the corresponding resulting signal SF1, SF2 or SF3 when the value of the histogram class of the corresponding processing stage VCi does not reach the maximum value Vmax (step S4 in FIG. 4), and otherwise to deliver a binary signal as always in the low state so as to stop the production of the histogram (step S5 in FIG. 4).

Although not indispensable, it would be preferable that each control stage ECON0, ECON1, ECON2 or ECON3 additionally includes an activation stage EA, notably when the optical detection circuit 6 is implemented physically close to other circuits 7, 8 and 9 of the optical detection device DIS.

The activation stage EA includes an AND logic gate intended to receive at the input the binary signals from the comparison stages EC0, EC1, EC2 or EC3 and configured to deliver an activation signal SA to the optical detection circuit 6.

When the value of any one of the histogram classes reaches the maximum value Vmax, the activation signal SA is in its low state so as to stop the biasing of the SPAD diode, for example by deactivating the voltage applied to the anode of the SPAD diode.

As such, the optical detection circuit 6 can advantageously be deactivated or placed in standby so as to save average energy consumption of the optical detection device DIS.

Thus, an optical detection device is obtained providing a management of its dynamic range via the choice of a maximum value. When such a device is implemented in a matrix of optical detection devices of an imaging system, the management of its dynamic range provides for avoiding a saturation of the measurement by the optical detection device regardless of the measurement time imposed by the imaging system.

Therefore, the overall performance of such a system can advantageously be improved and its average energy consumption reduced notably when background optical light radiation is strong.

What is claimed is:

1. A method for managing a dynamic range of an optical detection device illuminated by a modulated optical radiation, the method comprising:
    generating a detection signal from the modulated optical radiation;
    generating, based on the detection signal, a histogram comprising a plurality of histogram classes;
    comparing a maximum value and a value of each histogram class of the plurality of histogram classes; and
    stopping a generation of the histogram in response to a determination that the value of any one of the plurality of histogram classes is equal to the maximum value.

2. The method according to claim 1, further comprising stopping a generation of the detection signal in response to a determination that the value of any one of the plurality of histogram classes is equal to the maximum value.

3. The method according to claim 1, wherein the maximum value is modifiable.

4. The method according to claim 1, wherein the plurality of histogram classes is defined as a function of a frequency of the modulated optical radiation.

5. The method according to claim 1, wherein generating the detection signal comprises detecting single photons received by at least one photon detector.

6. The method according to claim 5, wherein the photon detector comprises a single-photon avalanche diode.

7. The method according to claim 1, wherein the plurality of histogram classes is indicative of a number of photons received by the optical detection device in a plurality of integration time windows.

8. An optical detection device, comprising:
    an optical detection circuit configured to be illuminated by a modulated optical radiation and configured to generate a detection signal from the modulated optical radiation;
    a processing circuit configured to generate, based on the detection signal, a histogram comprising a plurality of histogram classes;
    a comparison circuit configured to compare a maximum value and a value of each histogram class of the plurality of histogram classes; and
    a control circuit configured to deactivate the processing circuit so as to stop a generation of the histogram in response to a determination that the value of any one of the plurality of histogram classes is equal to the maximum value.

9. The optical detection device according to claim 8, wherein the control circuit is further configured to deactivate the optical detection circuit so as to stop a generation of the detection signal in response to a determination that the value of any one of the plurality of histogram classes is equal to the maximum value.

10. The optical detection device according to claim 8, wherein the maximum value is adjustable.

11. The optical detection device according to claim 10, wherein the maximum value is programmable.

12. The optical detection device according to claim 8, wherein the plurality of histogram classes is defined as a function of a frequency of the modulated optical radiation.

13. The optical detection device according to claim 8, wherein the optical detection circuit comprises a single-photon avalanche diode type.

14. The optical detection device according to claim 8, wherein the optical detection circuit comprises a matrix of single-photon detectors and a logic gate coupled to an output of the matrix of single-photon detectors, wherein the detection signal is asserted at an output of the logic gate.

15. The optical detection device according to claim 8, wherein the processing circuit is configured to generate the histogram comprising the plurality of histogram classes by accumulating a number of pulses of the detection signal detected in a respective integration time window of a plurality of integration time windows.

16. The optical detection device according to claim 15, wherein the control circuit comprises a phase generation stage configured to generate a plurality of phase signals corresponding to the plurality of integration time windows.

17. The optical detection device according to claim 15, wherein the plurality of histogram classes is indicative of a number of photons received by the optical detection device in the plurality of integration time windows.

18. A device comprising:
    an optical detection device configured to be illuminated by a modulated optical radiation;
    a processor; and
    a non-transitory computer-readable storage medium storing a program to be executed by the processor, the program including instructions for:
        generating a detection signal from the modulated optical radiation;
        generating, based on the detection signal, a histogram comprising a plurality of histogram classes;

comparing a maximum value and a value of each histogram class of the plurality of histogram classes; and stopping a generation of the histogram in response to a determination that the value of any one of the plurality of histogram classes is equal to the maximum value.

19. The device according to claim 18, wherein the device comprises a motor vehicle.

20. The device according to claim 18, wherein the device comprises a mobile communication device.

* * * * *